(12) United States Patent
Nitta (10) Patent No.: US 10,406,833 B2
(45) Date of Patent: Sep. 10, 2019

(54) ELASTIC ROLLER

(71) Applicant: SATO HOLDINGS KABUSHIKI KAISHA, Tokyo (JP)

(72) Inventor: Haruhiko Nitta, Hyogo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/506,537

(22) PCT Filed: Aug. 25, 2015

(86) PCT No.: PCT/JP2015/073774
§ 371 (c)(1),
(2) Date: Feb. 24, 2017

(87) PCT Pub. No.: WO2016/031792
PCT Pub. Date: Mar. 3, 2016

(65) Prior Publication Data
US 2017/0274679 A1    Sep. 28, 2017

(30) Foreign Application Priority Data

Aug. 29, 2014 (JP) .................................. 2014-175690

(51) Int. Cl.
*B41J 11/057* (2006.01)
*B41J 11/20* (2006.01)
(Continued)

(52) U.S. Cl.
CPC .............. *B41J 11/20* (2013.01); *B41J 3/4075* (2013.01); *B41J 11/057* (2013.01);
(Continued)

(58) Field of Classification Search
CPC ........ B41J 11/057; B41J 11/20; B41J 3/4075; B65C 9/30; B65C 9/1807; B65H 27/00;
(Continued)

(56) References Cited

U.S. PATENT DOCUMENTS 2,534,408 A * 12/1950 Bramberry, Jr. ........ F02B 77/02
156/268
3,833,040 A     9/1974 Bins
(Continued)

FOREIGN PATENT DOCUMENTS

JP     55-084646   *  6/1980  ............. B29H 21/02
JP     01-271349 A    10/1989
(Continued)

OTHER PUBLICATIONS

Chinese Office Action, dated Mar. 19, 2018, 8 pages.

*Primary Examiner* — Jill E Culler
*Assistant Examiner* — Marissa Ferguson-Samreth
(74) *Attorney, Agent, or Firm* — Foley & Lardner LLP (57) ABSTRACT

Formation of a plurality of wear visibility grooves 10 has been focused. An elastic roller includes: an inner layer side elastic material 4; a coating layer 5 disposed on an outer periphery of the inner layer side elastic material 4, the coating layer configured to make contact with the belt-shaped member; and a plurality of wear visibility grooves 10 (11, 12, 13) formed on an inner side of the coating layer 5 and formed on a surface of the inner layer side elastic material 4 in a circumferential direction, the plurality of wear visibility grooves being successively formed in an axial direction of the roller shaft, wherein at least two grooves of the plurality of wear visibility grooves have different heights, and filler is filled in the plurality of wear visibility grooves 10, the filler having a color different from that of the inner layer side elastic material 4 and different from that of the coating layer 5, and material of the filler is the same as that of the coating layer 5.

35 Claims, 4 Drawing Sheets

(51) Int. Cl.
*B65H 5/06* (2006.01)
*B41J 3/407* (2006.01)
*B65C 9/18* (2006.01)
*B32B 25/20* (2006.01)
*B41F 33/00* (2006.01)

(52) U.S. Cl.
CPC ............ *B65C 9/1807* (2013.01); *B65H 5/06* (2013.01); *B32B 25/20* (2013.01); *B41F 33/0045* (2013.01)

(58) Field of Classification Search
CPC ... B65H 5/06; B60C 11/24; B60C 2011/0355; B60C 2011/0367; F16C 13/00; B41F 33/0045; B32B 25/20
See application file for complete search history.

(56) References Cited

U.S. PATENT DOCUMENTS

| | | | | |
|---|---|---|---|---|
| 5,753,348 A | * | 5/1998 | Hatakeyama | G03G 15/2053 399/122 |
| 2005/0119097 A1 | * | 6/2005 | Nishimori | B41J 13/02 492/56 |
| 2006/0005905 A1 | * | 1/2006 | Croissant | B60C 11/0302 152/154.2 |
| 2007/0012549 A1 | * | 1/2007 | Kanaris | B65G 39/02 198/835 |
| 2007/0295432 A1 | * | 12/2007 | Posada | B29D 30/3007 152/154.2 |
| 2010/0036005 A1 | * | 2/2010 | Sasagawa | C08J 9/405 521/54 |
| 2011/0111127 A1 | | 5/2011 | Kanaris | |
| 2011/0211034 A1 | | 9/2011 | Katayama | |
| 2013/0333458 A1 | * | 12/2013 | Lamb | B60C 13/001 73/146 |
| 2015/0328937 A1 | * | 11/2015 | Girard | B60C 11/24 152/154.2 |

FOREIGN PATENT DOCUMENTS

| | | | | |
|---|---|---|---|---|
| JP | 06-001510 A | | 1/1994 | |
| JP | 08-53251 | * | 2/1996 | ............ B65H 27/00 |
| JP | 09-052638 A | | 2/1997 | |
| JP | 2000-016611 | * | 6/1998 | ............... B65H 3/06 |
| JP | 11-007212 A | | 1/1999 | |
| JP | 2002-116608 | * | 4/2002 | ............. G03G 15/02 |
| JP | 2011-31426 A | | 2/2011 | |
| JP | 2011-137914 | * | 7/2011 | ............. G03G 15/08 |
| JP | 2014-087988 | * | 3/2012 | ............... B41J 11/04 |
| JP | 2013-49146 | * | 3/2013 | ............... B41J 11/04 |
| JP | 2013-119936 A | | 6/2013 | |
| JP | 2013-193249 | * | 9/2013 | ............... B41J 11/04 |
| KR | 750314 | * | 5/2006 | ............. C25D 17/10 |
| NL | 1364988 | * | 6/1972 | |

* cited by examiner

ELASTIC ROLLER

TECHNICAL FIELD

The present disclosure relates to an elastic roller such as a platen roller or a nip roller, etc. that feeds a belt-shaped member such as a linerless label or a typical label with a liner, etc. Specifically, it relates to a roller with which one can visually recognize wear volume thereof and time for replacement thereof.

BACKGROUND ART

Conventionally, as disclosed in a Japanese laid-open patent publication No. 2011-31426, an elastic roller (a platen roller for example) has been used in a thermal printer, etc. A print paper is pinched between a thermal head and a platen roller with preset print pressure. Heat generation based on print data from the thermal head is utilized, and the print paper is fed with rotation of the platen roller driven. Accordingly, necessary information is printed on the print paper.

A circumferential length of the platen roller plays an important role in print quality of the print paper. More specifically, when wear volume of the platen roller is greater than a certain value, the diameter of the platen roller becomes small and accordingly the circumferential length of the platen roller becomes short.

Consequently, as wear of the platen roller proceeds with long term usage thereof, a length of a printed character becomes smaller. Thus, a problem arises that print accuracy is degraded.

In view of the above, when wear volume of the platen roller is greater than a certain value, it is required to replace the platen roller with a new one. Thus, an elastic roller has been demanded with which one can control limit of print accuracy or print quality.

However, it is virtually impossible to visually observe wear volume of a platen roller. Thus, there is a problem that it is difficult for a user of the platen roller to be aware of time for replacement thereof.

Incidentally, it is possible for a user to be indirectly aware of time for replacement of the platen roller by checking a calculation result of a feeding distance of a print paper based on a data amount for printing in a thermal printer. However, wear volume varies in accordance with a condition of usage of the thermal printer such as an ambient environmental condition around the thermal printer, print pressure, a kind of a print paper or an arrangement of a print paper. Thus, an elastic roller has been demanded with which one can directly and visually recognize wear volume of the elastic roller.

Further, because influence on print quality by variation of wear volume with usage of the platen roller is not even, a method has been demanded with which one can determine time for replacement of the platen roller in accordance with wear volume of the platen roller.

Needless to say, the same problem and the same demand exist not only in a platen roller but also in the other elastic roller.

SUMMARY OF THE INVENTION

Problems to be Solved by the Invention

The present disclosure serves to solve the aforementioned problems, and provides an elastic roller with which one can visually recognize wear volume thereof and time for replacement thereof.

The present disclosure further serves to provide an elastic roller with which one can control limit of print quality of a printer such as a thermal printer.

The present disclosure further serves to provide an elastic roller with which one can determine time for replacement thereof in accordance with degree of wear in use.

Means for Solving the Problems

The present disclosure focuses on forming a plurality of wear visibility grooves. Accordingly, the elastic roller according to the present disclosure is an elastic roller for feeding a belt-shaped member, the elastic roller including: a roller shaft; and an elastic material member surrounding the roller shaft, the elastic material member configured to feed the belt-shaped member by making contact with the belt-shaped member. The elastic material member includes: an inner layer side elastic material disposed on an outer periphery of the roller shaft; a coating layer disposed on an outer periphery of the inner layer side elastic material, the coating layer configured to make contact with the belt-shaped member; and a plurality of wear visibility grooves formed on an inner side of the coating layer and formed on a surface of the inner layer side elastic material in a circumferential direction. The plurality of wear visibility grooves is successively formed in an axial direction of the roller shaft. At least two grooves of the plurality of wear visibility grooves have different heights. Filler is filled in the plurality of wear visibility grooves. The filler has a color different from that of the inner layer side elastic material and different from that of the coating layer. Material of the filler is the same as that of the coating layer.

Depths of the plurality of wear visibility grooves may vary step-wise in an axial direction of the roller shaft.

Depths of the plurality of wear visibility grooves may vary irregularly in an axial direction of the roller shaft.

The plurality of wear visibility grooves may have a width of 25 to 1300 μm.

The plurality of wear visibility grooves may have a depth of 25 to 1300 μm.

The plurality of wear visibility grooves may be disposed in different positions along an axial direction of the roller shaft.

The inner layer side elastic material may include a plurality of inner layer grooves in a circumferential direction thereof, the plurality of inner layer grooves disposed in parallel with the wear visibility grooves.

The coating layer may include a plurality of coating layer grooves in a circumferential direction, the plurality of coating layer grooves disposed on an outer side of the plurality of inner layer grooves.

The inner layer side elastic material may include a flat inner layer platform-shaped apex portion between the plurality of inner layer grooves.

The coating layer may include a flat coating layer platform-shaped apex portion between the plurality of coating layer grooves.

The plurality of inner layer grooves may have a pitch of 500 to 1500 μm.

The plurality of inner layer grooves may have a width of 25 to 1300 μm.

The plurality of inner layer grooves may have a depth of 25 to 500 μm.

Each of the plurality of inner layer grooves may have a V-shaped cross-section and a groove angle of 40 to 160 degrees.

The coating layer may have a thickness of 10 to 100 μm.

The plurality of wear visibility grooves may include a first groove, a second groove and a third groove formed successively in an axial direction of the roller shaft. A first depth of the first groove may be the deepest, a second depth of the second groove may be the shallowest, and a third depth of the third groove may be an intermediate depth between the first depth and the second depth.

The inner layer side elastic material may have a rubber hardness of 30 to 80 degrees according to a Durometer Hardness Testing Method Type A defined in JIS K6253, and the coating layer may be formed from a silicone resin having a hardness of 20 degrees or less based on a spring type hardness tester Asker C in accordance with SRIS 0101.

The silicone resin may have a thermosetting property.

The inner layer side elastic material may be formed from a thermoplastic elastomeric material or a thermosetting elastomeric material.

Effects of the Invention

With regard to the elastic roller according to the present disclosure, there are provided a plurality of wear visibility grooves successively formed between the inner layer side elastic material and the coating layer. At least two grooves of the plurality of wear visibility grooves have different heights. The filler, which is filled in the plurality of wear visibility grooves, has a color different from that of the inner layer side elastic material and different from that of the coating layer, and material of the filler is the same as that of the coating layer. When the elastic roller is used as a platen roller, wear of the platen roller proceeds as the platen roller pinches a print paper with a thermal head to feed the print paper for printing. As the wear proceeds, width or a visible number of the plurality of wear visibility grooves may vary. Thus, one can visually recognize extent of the wear of the elastic roller and properly determine time for replacement of the elastic roller.

DETAILED DESCRIPTION OF THE INVENTION

The present invention relates to the Japanese patent application number 2014-175690 filed on Aug. 29, 2014 with Japan patent office, the entire of which is herein incorporated by reference.

According to an embodiment of the present disclosure, the elastic roller is realized that includes a plurality of wear visibility grooves, at least two of which are formed to have different heights. Thus, one can visually recognize extent of wear of the elastic roller and properly determine time for replacement of the elastic roller.

With referent now to FIGS. 1 to 3, an embodiment of the present disclosure will be described in which the present elastic roller is configured as a platen roller 1.

Figure 1:
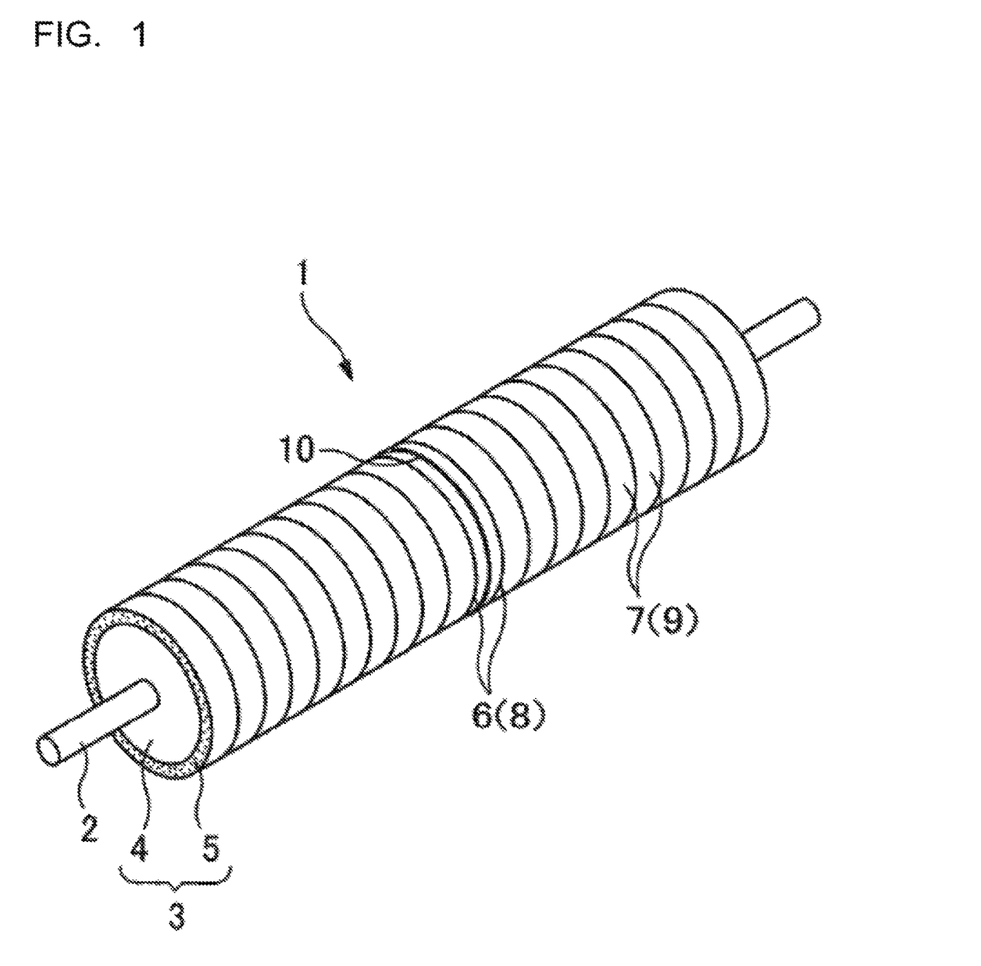
FIG. 1 shows a perspective view of an elastic roller (a platen roller 1) according to an embodiment of the present disclosure.
Figure 2:
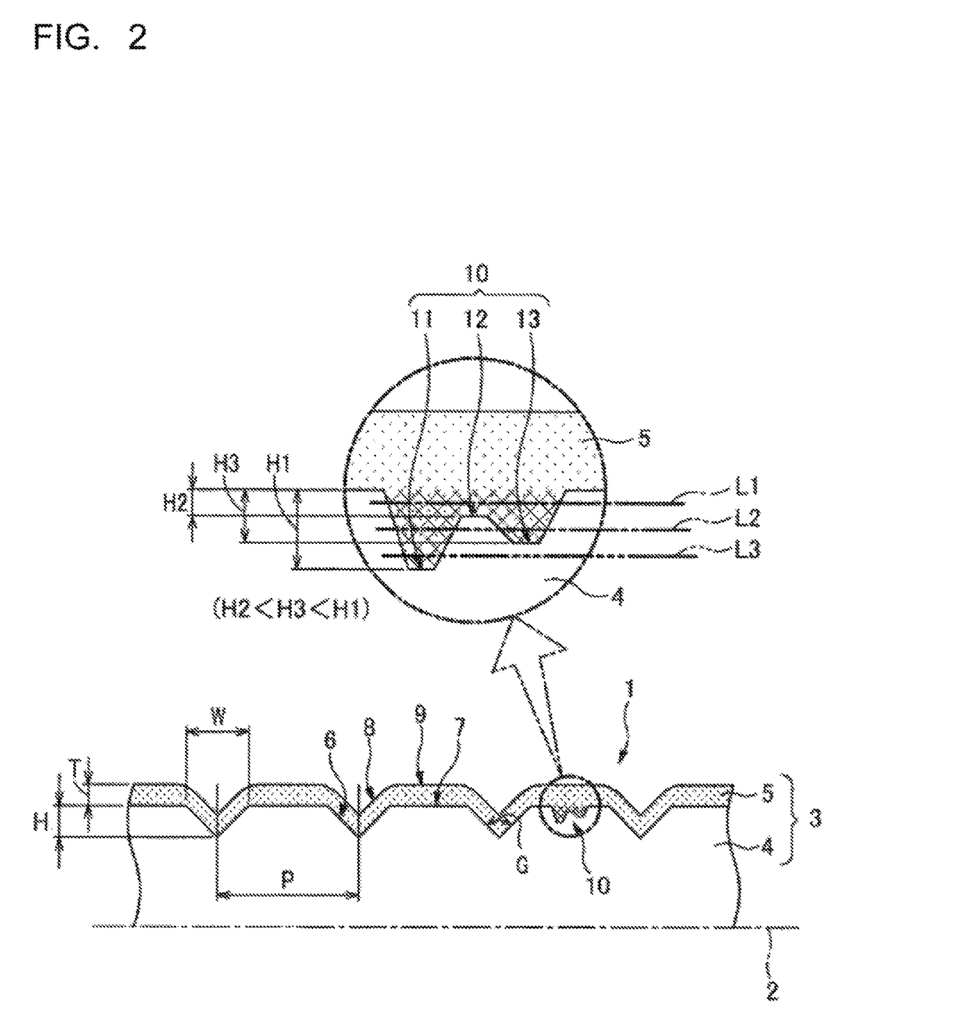
FIG. 2 shows enlarged cross-sectional view of an axial direction of a main part of the platen roller 1 according to the embodiment.

FIG. 1 shows a perspective view of the platen roller 1; and FIG. 2 shows enlarged cross-sectional view of an axial direction of a main part of the platen roller 1.

The platen roller 1 includes a roller shaft 2 and an elastic material member 3. The elastic material member 3 attaches to an outer periphery of the roller shaft 2 and is integrally rotatable together with the roller shaft 2. The platen roller 1 feeds a label (e.g., a linerless label 15; see FIG. 3) by bringing the label into contact with the elastic material member 3.

The elastic material member 3 includes a cylinder-shaped inner layer side elastic material 4 and a coating layer 5 (outer layer side elastic material member). The inner layer side elastic material 4 is disposed on an outer periphery of the roller shaft 2. The coating layer 5 is integrally disposed on an outer periphery of the inner layer side elastic material 4 and contacts the linerless label 15.

Grooves (namely, inner layer grooves 6, coating layer grooves 8, wear visibility grooves 10) are formed on a surface of the platen roller 1. The grooves will be described later with reference to FIG. 2.

Firstly, material of the inner layer side elastic member 4 will be explained.

The inner layer side elastic member 4 may be composed of a thermoplastic elastomeric material or a thermoplastic thermosetting elastomeric material.

For example, polyethylene, polypropylene, polymethylpentene, polybutene, crystallized polybutadiene, polybutadiene, styrene-butadiene resin, polyvinyl chloride, polyvinyl acetate, polyvinylidene chloride, ethylene-vinyl acetate copolymer, ethylene-propylene copolymer, ethylene-propylene-diene copolymer, ionomer, polymethyl-methacrylate, polytetrafluoroethylene, ethylene-polytetrafluoroethylene copolymer, polyacetal(polyoxymethylene), polyamide, polycarbonate, polyphenyleneether, polyethylene terephthalate, polybutylene terephthalate, polyarylate, polystyrene, polyethersulfone, polyimide, polyamide-imide, polyphenylenesulfide, polyoxybenzoyl, polyether ether ketone, polyetherimide, polystyrene, polyurethane, polyester, 1,2-polybutadiene, phenol resin, urea resin, melamine resin, benzoguanamine resin, diallyl phthalate resin, alkyd resin, epoxy resin, or silicon resin may be employed as the synthetic resin usable for the inner layer side elastic material 4.

In addition, a thermosetting elastomeric material such as a thermosetting silicone rubber, a one-liquid type RTV (Room Temperature Vulcanizing) rubber, a two-liquid type RTV rubber, an LTV (Low Temperature Vulcanizable) silicone rubber, or an oil resistant thermosetting rubber may be used as the inner layer side elastic material 4. Among them, a millable type silicone rubber is preferable.

The inner layer side elastic material 4 has a hardness of 30 to 80 degrees (rubber hardness according to a Durometer Hardness Testing Method Type A defined in JIS K6253, hereinafter referred to as "A hardness").

In a case where an A hardness is below 30 degrees, the degree of hardness is too soft for the platen roller 1 to feed and guide a belt-shaped member such as the linerless label 15, i.e., a feeding function of the platen roller 1 does not perform properly because of excessive contact and frictional force. Moreover, a printing quality of the thermal printer 14 (which will be later described with reference to FIG. 3) may be deteriorated.

In a case where an A hardness exceeds 80 degrees, the degree of hardness is too hard for the platen roller 1, such that the feeding force and the feeding precision thereof may be deteriorated.

Note that rubber hardness according to a Durometer Hardness Testing Method Type A defined in JIS K6253 corresponds to one according to ISO-7619-1, or ASTM D 2240.

The entire contents of JIS K6253, ISO-7619-1 and ASTM D 2240 are herein incorporated by reference.

The coating layer 5 is composed of a silicone resin such as a heat-curable silicone resin having a C hardness (hardness according to a spring type hardness tester Asker C in accordance with SRIS 0101, hereinafter referred to as "C hardness") of 20 degrees or less.

For example a silicone resin such as silicone gel, a RTV (Room Temperature Vulcanizing) liquid silicone rubber, an LTV (Low Temperature Vulcanizable) liquid silicone rubber, an ultraviolet light curable liquid silicone rubber, or a thermosetting liquid silicone rubber may be used as the silicone resin.

The silicone resin inherently possesses a non-stick property or a release property, and the silicone resin may prevent attachment by the adhesive agent layer 22 of the linerless label 15 even in a case where the linerless label 15 or the like is pressed thereagainst and fed.

A thermosetting silicone resin may also be easily set to a C hardness of the coating layer 5 by a relatively simple preparation and manufacturing process under thermosetting conditions.

In a case where a C hardness of the coating layer 5 is 20 degrees or less, the silicone resin is in a gel form of the appropriate softness. The linerless label 15 clearly also possesses a necessary frictional force (gripping power) with respect to a belt-shaped member such as the linerless label 15 and a superior anti-wear property.

Therefore, the platen roller 1 also includes the necessary release property and the gripping force with respect to a belt-shaped member such as the linerless label 15 or a label with a liner. Accordingly, the platen roller 1 is able to provide stable feeding and guidance function.

In a case where the C hardness of the coating layer 5 exceeds 20 degrees, the elastic property of the coating layer 5 approaches that of a rubber material. Thus, an adhesive property of a surface of the coating layer 5 is dramatically increased, and the coating layer 5 is easily worn down.

Note that hardness according to a spring type hardness tester Asker C in accordance with SRIS 0101(namely, C hardness) is globally used as a de facto standard for low hardness measurement, and corresponds to a standard in accordance with JIS K 7312.

The entire contents of SRIS 0101 and JIS K 7312 are herein incorporated by reference.

The coating layer 5 has a coating layer thickness T (see, FIGS. 2) of 10 to 100 µm, In a case where the coating layer thickness T is less than 10 µm, a coating thickness on the coating layer 5 is uneven, and a stable release property and a gripping force are not easily obtained.

In a case where the coating layer thickness T exceeds 100 µm, the coating of the inner layer side elastic material 4 in the platen roller 1 becomes fragile and easily damaged.

Next, grooves formed on a surface of the platen roller 1 (namely, inner layer grooves 6, coating layer grooves 8, wear visibility grooves 10, etc.) will be explained with reference to FIGS. 1 and 2.

With respect to the platen roller 1, a plurality of cross-sectional (more precisely, cross-section intersecting by a plane that includes an axial line of the platen roller 1) V-shaped inner layer grooves 6 are formed along a circumferential direction of the inner layer side elastic material 4, and the coating layer 5 is formed on an outer periphery of the plurality of inner layer grooves 6.

The inner layer side elastic material 4 may include a flat inner layer platform-shaped apex portion 7 between the plurality of inner layer grooves 6.

The coating layer 5, which is disposed on the outer periphery of the inner layer side elastic material 4, includes a plurality of coating layer grooves 8 along a circumferential direction thereof. Positions of the plurality of coating layer grooves 8 correspond to those of the plurality of inner layer grooves 6. The section of each of the coating layer grooves 8 is substantially V-shaped (see FIG. 2).

The coating layer 5 may include a flat coating layer platform-shaped apex portion 9 between the plurality of coating layer grooves 8.

It should be noted that a sectional shape of the inner layer grooves 6 and/or the coating layer grooves 8 is not limited to be a V-shape, and may be a U-shape, a mortar-shape (that is, roughly V-shape with a flat bottom), or a polygon such as a rectangular.

The inner layer grooves 6 have a pitch P of 500 to 1500 µm.

In a case where the pitch P of the inner layer grooves 6 is less than 500 µm, it is almost impossible to process such a small area of the inner layer platform-shaped apex portion 7, which is formed between two of the inner layer grooves 6 that are adjacent to each other.

In a case where the pitch P of the inner layer grooves 6 exceeds 1500 µm, there is decrease in a percentage of the inner layer grooves 6 and the coating layer grooves 8 with respect to the entire platen roller 1, there tends to be increase in a contact area between the platen roller 1 and a belt-shaped member such as the linerless label 15, and accordingly there tends to be decrease in release property of the platen roller 1.

The inner layer grooves 6 have a width W of 25 to 1300 µm, and more preferably a width W of 50 to 500 µm.

In a case where the inner layer grooves 6 have a width W of less than 25 µm, a contact area between the platen roller 1 and a belt-shaped member such as the linerless label 15 is increased. As a result, the release property of the platen roller 1 may be decreased.

In a case where the inner layer grooves 6 have a width W exceeding 1300 µm, the platen roller 1 decreases the pressing force of a part on the linerless label 15 or the like by the application of the appropriate pressure from the adhesive agent layer 22 side, such that printing precision may be decreased, e.g., printing omissions or the like with respect to a label piece 15A may occur with a printing part 19 (see FIG. 3) of the thermal printer 14.

The inner layer grooves 6 have a depth H of 25 to 500 µm, and more preferably a depth H of 50 to 400 µm.

In a case where the inner layer grooves 6 have a depth H of less than 25 µm, a contact area between a belt-shaped member such as the linerless label 15 is increased. As a result, the release property of the platen roller 1 may be decreased.

In a case where the inner layer grooves 6 have a depth H exceeding 500 µm, the platen roller 1 decreases the pressing force of a part on the linerless label 15 or the like by the application of the appropriate pressure from the adhesive agent layer 22 side, such that printing precision may be decreased with respect to a label piece 15A in a printing part 19 of the thermal printer 14, e.g., printing omissions or the like may occur.

The inner layer grooves 6 have a groove angle G of 40 to 160 degrees, and more preferably a groove angle G of 90 to 150 degrees.

In a case where the inner layer grooves 6 have a groove angle G of less than 40 degrees, a contact area between the platen roller 1 and a belt-shaped member such as the linerless label 15 is increased. As a result, the release property of the platen roller 1 may be decreased.

In a case where the inner layer grooves 6 have a groove angle G exceeding 160 degrees, the platen roller 1 decreases the pressing force of a part on the linerless label 15 or the like by the application of the appropriate pressure from the adhesive agent layer 22 side, such that printing precision may be decreased, e.g., printing omissions or the like with respect to a label piece 15A may occur with a printing part 19 of the thermal printer 14.

Further, the present disclosure applies a plurality of wear visibility grooves 10 formed on an inner side of the coating layer 5 and formed on a surface of the inner layer side elastic material 4 in a circumferential direction.

In other words, a plurality of inner layer grooves 6 is formed on the inner layer side elastic material 4 in the circumferential direction thereof, in parallel with the plurality of wear visibility grooves 10.

Note that, in the illustrated example, the plurality of wear visibility grooves 10 is located at the inner layer platform-shaped apex portion 7 of the inner layer side elastic material 4.

As particularly illustrated in FIG. 2 in an enlarged fashion, the plurality of wear visibility grooves 10 (three grooves applied in the exemplary drawing) are formed successively in an axial direction of the roller shaft 2.

That is, the plurality of wear visibility grooves 10 includes a first groove 11, a second groove 12 and a third groove 13. These grooves are formed successively in an axial direction of the roller shaft 2.

According to the present disclosure, it is required that at least two grooves of the first groove 11, the second groove 12 and the third groove 13 have different heights.

For example, a first depth H1 of the first groove 11 is the deepest, a second depth H2 of the second groove 12 is the shallowest, and a third depth H3 of the third groove 13 is an intermediate depth between the first depth H1 and the second depth H2 (that is, H2<H3<H1).

Further, filled in the plurality of wear visibility grooves 10 is filler having a color different from that of the inner layer side elastic material 4 and different from that of the coating layer 5. Material of the filler is the same as that of the coating layer 5.

For example, color of the inner layer side elastic material 4 and the coating layer 5 is white or transparent, while the color of the plurality of wear visibility grooves 10 is blue.

The plurality of wear visibility grooves 10 may have a width of 25 to 1300 μm. The width may be 300 μm, for example.

An opening width of the first groove 11 may be 120 μm, an opening width of the second groove 12 may be 60 μm, and an opening width of the third groove 13 may be 120 μm.

When the width of the plurality of wear visibility grooves 10 is less than 25 μm, there is a drawback that one may not be able to visually recognize or check the plurality of wear visibility grooves 10.

When the width of the plurality of wear visibility grooves 10 is greater than 1300 μm, there is a drawback that it takes long time for the filler to disappear from the plurality of wear visibility grooves 10 and accordingly time for replacement of the platen roller 1 becomes later than is assumed.

The plurality of wear visibility grooves 10 may have a depth of 25 to 1300 μm. The depth may be 75 μm or 130 μm for example.

The depth H1 of the first groove 11 may be 50 μm, the depth H2 of the second groove 12 may be 25 μm, and the depth H3 of the third groove 13 may be 40 μm.

When the depth of the plurality of wear visibility grooves 10 is less than 25 μm, there is a drawback that the filler in the plurality of wear visibility grooves 10 may disappear after the platen roller 1 feeds the linerless label 15 for a short period of time.

When the depth of the plurality of wear visibility grooves 10 is greater than 1300 μm, there is a drawback that it takes long time for the filler to disappear from the plurality of wear visibility grooves 10 and accordingly time for replacement of the platen roller 1 becomes later than is assumed.

Figure 3:
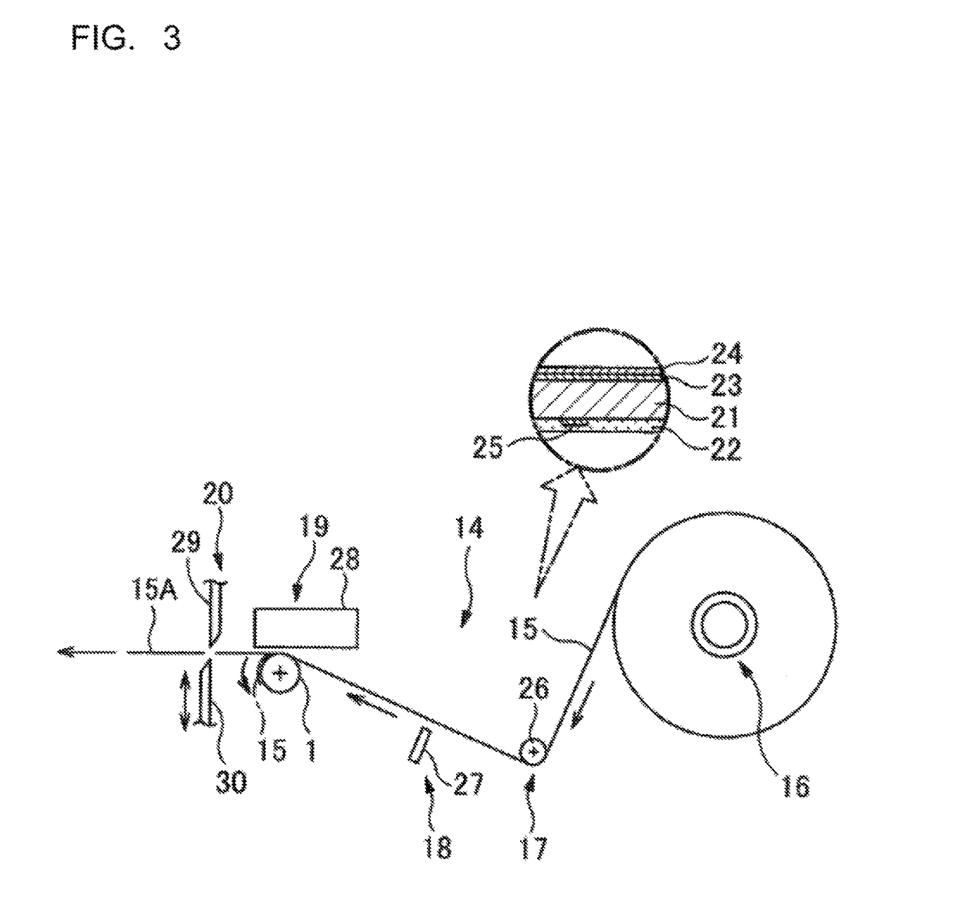
FIG. 3 shows a rough side view of a thermal printer 14 equipped with the platen roller 1 according to the embodiment.

FIG. 3 shows a schematic side view of a thermal printer 14 that is equipped with the platen roller 1 described above. The thermal printer 14 includes a supplier 16 of a print paper (the linerless label 15 for example); a guide member 17; a detector 18; a printing part 19; and a cutter 20.

As a portion of the section of the linerless label 15 is illustrated in an enlarged fashion, the linerless label 15 includes a label base member 21; an adhesive agent layer 22 that is disposed on a back surface; a thermosensitive color developing agent layer 23 that is disposed on a front surface; and a transparent peeling agent layer 24 that is disposed on an outer side of the thermosensitive color developing agent layer 23.

Note that a position detection mark 25 is preprinted on the back surface side of the label base member 21.

Fixed information (not shown) such as design(s) like a mark or a name of a label user may be preprinted according to requirement(s) for the front surface side of the label base member 21.

A label piece 15A may be produced by cutting the linerless label 15 according to a preset pitch at the cutter 20.

The supplier 16 holds the linerless label 15 into a rolled shape, and the supplier 16 may feed out the linerless label 15 into a belt shape in a direction of the guide member 17, the detector 18, the printing part 19 or the cutter 20.

The guide member 17 includes a guide roller 26. The guide member 17 is able to guide the fed out linerless label 15 in a direction of the detector 18 or the printing part 19.

The detector 18 includes a location detection sensor 27. The detector 18 may detect a relative location of the linerless label 15 (label piece 15A) with respect to the printing part 19, by detecting the position detection mark 25 on the back surface side of the linerless label 15.

The printing part 19 includes a thermal head 28 and the platen roller 1 (exemplary elastic roller). The linerless label 15 is pinched between the thermal head 28 and the platen roller 1 via a predetermined printing pressure, the platen roller 1 is rotatably driven at a constant speed, and a thermosensitive color developing agent layer 23 develops color by a supply of printing data to a thermal head 28. Accordingly, predetermined variable information may be printed onto the linerless label 15 (label piece 15A).

The cutter 20 includes a fixed blade 29 and a movable blade 30. A printed linerless label 15 that has been fed between the fixed blade 29 and the movable blade 30 is cut according to a preset pitch, and a label piece 15A is issued and ejected.

The linerless label 15 is loaded into the thermal printer 14 as described above. As the linerless label 15 is fed and printed, the coating layer 5 of the platen roller 1 makes contact with the linerless label 15 at the printing part 19 and wear of the coating layer 5 proceeds gradually. As the enlarged section is illustrated in FIG. 2, the plurality of wear visibility grooves 10 including the first groove 11, the second groove 12 and the third groove 13 are formed at the inner layer side elastic material 4. Thus, in an early phase of wear (a first wear level L1 as indicated with a dashed-dotted line in FIG. 2), a blue coating layer material of the plurality of wear visibility grooves 10 is visually recognized as a single bold blue line of its maximum width.

As wear proceeds to reach a medium phase of wear (a second wear level L2 as indicated with a dashed-two dotted line in FIG. 2), coating layer material at the second groove 12 disappears and the first groove 11 and the third groove 13 still exist. At this time, the plurality of wear visibility grooves 10 is observed as two blue lines formed in the circumferential direction.

As wear further proceeds to reach a final phase of wear (a third wear level L3 as indicated with a dashed-three dotted line in FIG. 2), coating layer material at the third groove 13 also disappears and only the first groove 11 exists. At this time, the plurality of wear visibility grooves 10 is observed as a relatively narrow single blue line (narrow line).

As wear further proceeds, coating layer material at the first groove 11 also disappears and a blue line cannot be observed any longer. At this time, one is able to determine that the platen roller 1 needs to be replaced immediately.

Note that relation between status of visibility of the blue line(s) and time for replacement of the platen roller 1 may be predetermined based on condition(s) of the platen roller 1 and the print paper, etc.

As described above, depth or width of the plurality of wear visibility grooves 10, or each of the first groove 11, the second groove 12 and the third groove 13 of the plurality of wear visibility grooves 10 may be specified so that print incompletions or print omissions due to unevenness of print pressure between the thermal head 28 and the platen roller 1 do not occur. Then, depth or width of the plurality of wear visibility grooves 10, or each of the first groove 11, the second groove 12 and the third groove 13 of the plurality of wear visibility grooves 10 may be preset in accordance with a kind of a print paper such as the linerless label 15, a level of print pressure, a feed speed, or a feed distance. Consequently, one is able to visually confirm time for replacement of the platen roller 1 at a proper time in response to extent of wear of the platen roller 1.

Note that, with regard to the platen roller 1, the A hardness of the inner layer side elastic material 4 and the C hardness of the coating layer 5 may be determined properly as described, and each hardness of the inner layer grooves 6, the inner layer platform-shaped apex portion 7, the coating layer grooves 8, the flat coating layer platform-shaped apex portion 9, and the like may be limited to a predetermined range. Thereby, even when applying the linerless label 15, which exposes the adhesive agent layer 22, it becomes possible in long-time usage to prevent the linerless label 15 from being attached to the platen roller 1 and rolled up after having passed through the platen roller 1 (refer to the linerless label 15 indicated in a phantom line in FIG. 3).

In the present disclosure, depth of each groove of the plurality of wear visibility grooves 10 may be determined as needed. The depth may be increased/decreased or varied stepwise or irregularly in the axial direction of the roller shaft 2.

Figure 4:
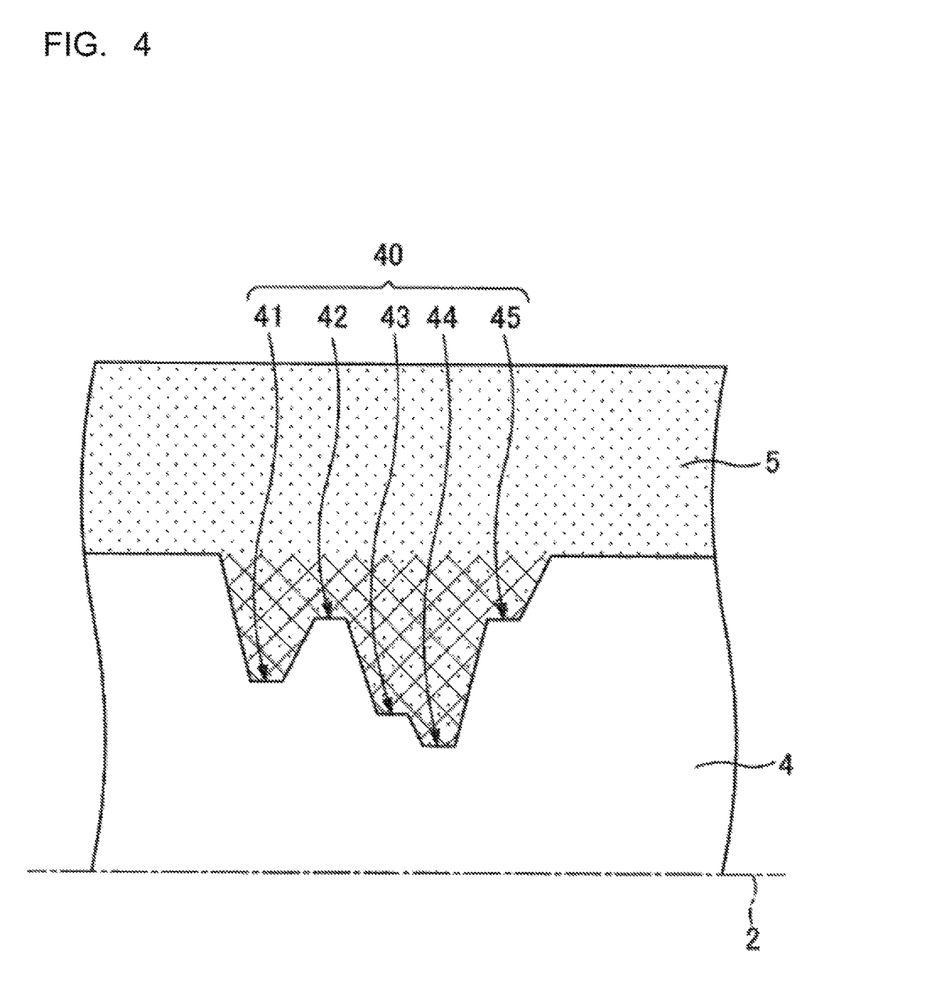
FIG. 4 shows enlarged cross-sectional view of a modified example of a plurality of wear visibility grooves.

For example, FIG. 4 shows enlarged cross-sectional view of a modified example of a plurality of wear visibility grooves. The modified example is a plurality of wear visibility grooves 40 that includes a first groove 41, a second groove 42, a third groove 43, a fourth groove 44 and a fifth groove 45, which are formed consecutively. The grooves are designed so that each depth is different as appropriate.

Thus, a number of and width of the plurality of wear visibility grooves 40 that are visible in blue for example varies as wear of the coating layer 5 proceeds, and one is therefore able to determine time for replacement of the platen roller 1.

Even when using the platen roller 1 having the plurality of wear visibility grooves 40 as described above, one can visually observe extent of the wear of the platen roller 1 in accordance with usage thereof and properly control time for replacement of the platen roller 1.

In the present disclosure, location and number of the plurality of wear visibility grooves 10 in the axial direction of the roller shaft 2 may be designed as needed. That is, the plurality of wear visibility grooves 10 may be formed at any needed positions or at a plurality of different positions along the axial direction of the roller shaft 2.

Respective grooves of the plurality of wear visibility grooves 10 may have a different color, depth, or width. Thereby, a variety of control information may be provided regarding extent of wear or time for replacement of the platen roller 1.

In the embodiment described above, an example has been explained in which an elastic roller is used as the platen roller 1 of the printer (the thermal printer 14); however, the elastic roller is not limited to the platen roller. The elastic roller according to the present disclosure may be used as a guide roller or a nip roller for example, taking advantage of its release property (non-stick property) and gripping property. On top of that, the elastic roller may be used as: a label pasting (pressing) roller of an automatic pasting machine; or, a guide roller or a drive roller for a print machine, a variety of coaters, or processing machine for a belt-shaped article.

A shape of an elastic roller may be designed as appropriate.

For example, the elastic roller may be a typical cylindrical shape whose diameter is constant in a plane orthogonal to the axial direction of the roller shaft 2. The elastic roller may be "substantially symmetrically cylinder-shaped" where a diameter thereof in a plane orthogonal to the axial direction of the roller shaft 2 is gradually and evenly decreased from the central portion to the both end portions along the axial direction of the roller shaft 2. Alternatively, the elastic roller may be "substantially asymmetrically cylinder-shaped" where a diameter thereof at one end portion along the axial direction of the roller shaft 2 is different from that at the other end portion along the axial direction of the roller shaft 2. Such diameter is defined in a plane orthogonal to the axial direction of the roller shaft 2 is different.

In contrast with the embodiment described above, the inner layer side elastic material 4 may be comprised of a plurality of layers that is formed from the roller shaft 2 to the outer layer. Then, each of the plurality of layers may have a different material.

Further, when the inner layer side elastic material 4 is comprised of a single layer or a plurality of layers, tear strength of the single layer or the plurality of layers may be determined as needed.

The invention claimed is:

1. An elastic roller for feeding a belt-shaped member, the elastic roller comprising:

a roller shaft; and an elastic material member surrounding the roller shaft, the elastic material member configured to feed the belt-shaped member by making contact with the belt-shaped member, the elastic material member including:
an inner layer side elastic material disposed on an outer periphery of the roller shaft;
a coating layer disposed on an outer periphery of the inner layer side elastic material, the coating layer configured to make contact with the belt-shaped member; and
a plurality of wear visibility grooves formed on a surface of the inner layer side elastic material in a circumferential direction, the plurality of wear visibility grooves being successively formed in an axial direction of the roller shaft,
wherein at least two grooves of the plurality of wear visibility grooves have different heights, and filler is filled in the plurality of wear visibility grooves, the filler having a color different from that of the inner layer side elastic material and different from that of the coating layer, and
wherein material of the filler is the same as that of the coating layer.

2. The elastic roller according to claim 1, wherein depths of the plurality of wear visibility grooves vary step-wise in the axial direction of the roller shaft.

3. The elastic roller according to claim 1, wherein depths of the plurality of wear visibility grooves vary irregularly in the axial direction of the roller shaft.

4. The elastic roller according to claim 1, wherein the plurality of wear visibility grooves has a width of 25 to 1300 μm.

5. The elastic roller according to claim 1, wherein the plurality of wear visibility grooves has a depth of 25 to 1300 μm.

6. The elastic roller according to claim 1, wherein the plurality of wear visibility grooves is disposed in different positions along the axial direction of the roller shaft.

7. The elastic roller according to claim 1, wherein the inner layer side elastic material includes a plurality of inner layer grooves in a circumferential direction thereof, the plurality of inner layer grooves disposed in parallel with the plurality of wear visibility grooves.

8. The elastic roller according to claim 7, wherein the coating layer includes a plurality of coating layer grooves in a circumferential direction thereof, the plurality of coating layer grooves disposed on an outer side of the plurality of inner layer grooves.

9. The elastic roller according to claim 8, wherein the coating layer includes a flat coating layer platform-shaped apex portion between the plurality of coating layer grooves.

10. The elastic roller according to claim 7, wherein the inner layer side elastic material includes a flat inner layer platform-shaped apex portion between the plurality of inner layer grooves.

11. The elastic roller according to claim 7, wherein the plurality of inner layer grooves has a pitch of 500 to 1500 μm.

12. The elastic roller according to claim 7, wherein the plurality of inner layer grooves has a width of 25 to 1300 μm.

13. The elastic roller according to claim 7, wherein the plurality of inner layer grooves has a depth of 25 to 500 μm.

14. The elastic roller according to claim 7, wherein each of the plurality of inner layer grooves has a V-shaped cross-section and a groove angle of 40 to 160 degrees.

15. The elastic roller according to claim 1, wherein the coating layer has a thickness of 10 to 100 μm.

16. The elastic roller according to claim 1, wherein the plurality of wear visibility grooves includes a first groove, a second groove and a third groove, formed successively in the axial direction of the roller shaft, and wherein a first depth of the first groove is deepest, a second depth of the second groove is shallowest, and a third depth of the third groove is an intermediate depth between the first depth and the second depth.

17. The elastic roller according to claim 1, wherein the inner layer side elastic material has a rubber hardness of 30 to 80 degrees according to a Durometer Hardness Testing Method Type A defined in JIS K6253, and the coating layer comprises a silicone resin having a hardness of 20 degrees or less based on a spring type hardness tester Asker C in accordance with SRIS 0101.

18. The elastic roller according to claim 17, wherein the silicone resin has a thermosetting property.

19. The elastic roller according to claim 1, wherein the inner layer side elastic material comprises a thermoplastic elastomeric material or a thermosetting elastomeric material.

20. The elastic roller according to claim 1,
wherein the elastic roller comprises a platen roller or a nip roller configured to be disposed in a printer; and
wherein the belt-shaped member comprises a linerless label or a label with a liner.

21. The elastic roller according to claim 1, wherein the plurality of wear visibility grooves are formed on the surface of the inner layer side elastic material beneath the coating layer such that the plurality of wear visibility grooves are not present at an exterior surface of the elastic material member.

22. The elastic roller according to claim 1, wherein the filler completely fills in the plurality of wear visibility grooves.

23. An elastic roller for feeding a belt-shaped member, the elastic roller comprising:
a roller shaft; and
an elastic material member surrounding the roller shaft, the elastic material member configured to feed the belt-shaped member by making contact with the belt-shaped member, the elastic material member including:
an inner layer side elastic material disposed on an outer periphery of the roller shaft;
a coating layer disposed on an outer periphery of the inner layer side elastic material, the coating layer configured to make contact with the belt-shaped member; and
a plurality of wear visibility grooves formed on a surface of the inner layer side elastic material in a circumferential direction, the plurality of wear visibility grooves being formed in an axial direction of the roller shaft,
wherein at least two grooves of the plurality of wear visibility grooves have different heights, and filler is filled in the plurality of wear visibility grooves, the filler having a color different from that of the inner layer side elastic material and different from that of the coating layer, and
wherein material of the filler is the same as that of the coating layer.

24. The elastic roller according to claim 23, wherein the plurality of wear visibility grooves is disposed in different positions along the axial direction of the roller shaft.

25. The elastic roller according to claim 23, wherein the inner layer side elastic material includes a plurality of inner layer grooves in a circumferential direction thereof, the plurality of inner layer grooves disposed in parallel with the plurality of wear visibility grooves.

26. The elastic roller according to claim 25, wherein the coating layer includes a plurality of coating layer grooves in a circumferential direction thereof, the plurality of coating layer grooves disposed on an outer side of the plurality of inner layer grooves.

27. The elastic roller according to claim 26, wherein the coating layer includes a flat coating layer platform-shaped apex portion between the plurality of coating layer grooves.

28. The elastic roller according to claim 25, wherein the inner layer side elastic material includes a flat inner layer platform-shaped apex portion between the plurality of inner layer grooves.

29. The elastic roller according to claim 25, wherein each of the plurality of inner layer grooves has a V-shaped cross-section and a groove angle of 40 to 160 degrees.

30. The elastic roller according to claim 23, wherein the inner layer side elastic material has a rubber hardness of 30 to 80 degrees according to a Durometer Hardness Testing Method Type A defined in JIS K6253, and the coating layer comprises a silicone resin having a hardness of 20 degrees or less based on a spring type hardness tester Asker C in accordance with SRIS 0101.

31. An elastic roller for feeding a belt-shaped member, the elastic roller comprising:
 a roller shaft; and
 an elastic material member surrounding the roller shaft, the elastic material member configured to feed the belt-shaped member by making contact with the belt-shaped member, the elastic material member including:
  an inner layer side elastic material disposed on an outer periphery of the roller shaft; and
  a plurality of wear visibility grooves formed on a surface of the inner layer side elastic material in a circumferential direction, the plurality of wear visibility grooves being successively formed in an axial direction of the roller shaft,
 wherein filler is filled in the plurality of wear visibility grooves, the filler having a color different from that of the inner layer side elastic material,
 wherein the plurality of wear visibility grooves includes a first groove, a second groove, and a third groove, the second groove being positioned between the first groove and the third groove, and
 wherein, with respect to a depth from a surface of the inner layer side elastic material, a depth of the first groove is deepest, a depth of the second groove is shallowest, and a depth of the third groove is an intermediate depth between the depth of the first groove and the depth of the second groove.

32. The elastic roller according to claim 31, wherein depths of the plurality of wear visibility grooves vary step-wise in the axial direction of the roller shaft.

33. The elastic roller according to claim 31, wherein depths of the plurality of wear visibility grooves vary irregularly in the axial direction of the roller shaft.

34. The elastic roller according to claim 31, wherein the plurality of wear visibility grooves is disposed in different positions along the axial direction of the roller shaft.

35. The elastic roller according to claim 31, wherein the plurality of wear visibility grooves includes a first groove, a second groove and a third groove, formed successively in the axial direction of the roller shaft, and wherein a first depth of the first groove is deepest, a second depth of the second groove is shallowest, and a third depth of the third groove is an intermediate depth between the first depth and the second depth.

\* \* \* \* \*